US005318733A

United States Patent [19]

Carduck et al.

[11] Patent Number: 5,318,733

[45] Date of Patent: Jun. 7, 1994

[54] PRODUCTION OF COMPACTED GRANULES FOR DETERGENTS

[75] Inventors: Franz-Josef Carduck, Haan; Hubert Pawelczyk; Wilfried Raehse, both of Duesseldorf; Jochen Jacobs, Wuppertal; Eduard Smulders, Hilden; Guenther Vogt, Toenisvorst, all of Fed. Rep. of Germany

[73] Assignee: Henkel Kommanditgesellschaft auf Aktien, Duesseldorf, Fed. Rep. of Germany

[21] Appl. No.: 834,251

[22] PCT Filed: Jul. 31, 1990

[86] PCT No.: PCT/EP90/01247

§ 371 Date: Apr. 9, 1992

§ 102(e) Date: Apr. 9, 1992

[87] PCT Pub. No.: WO91/02047

PCT Pub. Date: Feb. 21, 1991

[30] Foreign Application Priority Data

Aug. 9, 1989 [DE] Fed. Rep. of Germany ....... 3926253
Apr. 2, 1990 [DE] Fed. Rep. of Germany ....... 4010533

[51] Int. Cl.[5] .............................................. B29C 59/00

[52] U.S. Cl. ...................................... 264/15; 264/118; 264/122; 264/143

[58] Field of Search ................. 264/15, 118, 141, 142, 264/143, 122; 252/89.1, 174, 99

[56] References Cited

U.S. PATENT DOCUMENTS

| | | | |
|---|---|---|---|
| 3,627,865 | 12/1971 | Wittwer et al. | 264/118 |
| 3,806,285 | 4/1974 | Jensen | 264/143 |
| 5,002,691 | 3/1991 | Bolkan et al. | 252/186.25 |
| 5,075,058 | 12/1991 | Chan et al. | 264/118 |

*Primary Examiner*—Allan R. Kuhns
*Attorney, Agent, or Firm*—Ernest G. Szoke; Wayne C. Jaeschke; Real J. Grandmaison

[57] ABSTRACT

A process for the production of compacted granules for use in a detergent composition by providing a homogeneous, solid, free-flowing premix to which a plasticizer or lubricant is added, and extruding the mixture through a perforated die under a pressure of from about 25 bar to about 200 bar to form strands of the mixture. The perforated die has an opening width corresponding to a predetermined size of the granules. After emerging from the perforated die, the strands are cut to the predetermined size of the granules by means of a cutting unit. The process enables the preparation of detergent compositions containing increased contents of surfactant components.

9 Claims, No Drawings

PRODUCTION OF COMPACTED GRANULES FOR DETERGENTS

BACKGROUND OF THE INVENTION

1. Field of the Invention

This invention relates to a process for the production of compacted granules, to the granules obtained by this process and to storable and free-flowing detergent concentrates containing the granules.

In the field of solid, free-flowing household and institutional detergents and particularly in the field of powder-form laundry detergents, there is a trend towards the manufacture of products having increased apparent densities. Recent commercial products of this type have apparent densities of the order of 700 g/l. This increase in apparent density is consistent with the need for less packaging dictated by environmental requirements. Efforts to market detergents in the form of relatively highly concentrated mixtures of ingredients are being made with the same object in mind. At first, reducing the amount of diluents in the concentrates as an unnecessary salt component appeared to be a solution to the problem. However, the problem at hand is not easy to solve in this way. Prerequisites for such formulation changes are understandably that, on the one hand, the detergent performance required by the consumer remains at least comparable with that of commercially available products and, on the other hand, the stability of pourable, free-flowing products should also be guaranteed. As documented by the extensive prior art on the subject, satisfying this requirement profile poses considerable technological problems.

2. Discussion of Related Act

Thus, German patent application 20 50 560 describes a process for the production of particulate ("noodle-shaped") detergents having apparent densities of 500 to 900 g/l, in which a premix of specific composition is compacted "under pressure"and subsequently converted into strand form. Unfortunately, there are no references to the intensity of the pressure to be applied. To prevent the strands from sticking together, they have to be cooled by means of an air stream before they are size-reduced to pieces of certain length. The apparent density is inversely proportional to the length of the pieces.

German patent application 21 62 353 describes a process for the production of enzyme granules and enzyme-containing detergent granules having an apparent density of 300 to 1,000 g/l. In this process, a mechanically precompounded paste is extruded under a pressure of about 7 to 35 bar to form a long strand. To prevent the strands from sticking together to form relatively large aggregates on leaving the extruder, they have to be "deplasticized". This is done either by cooling or by evaporation of the moisture, the solvent or the plasticizer (surface hardening). Only then can the strands be broken up into relatively small pieces of the required length.

According to the teaching of German patent application 22 24 300, granulated detergents having apparent densities of 300 to 800 g/l are obtained by extrusion and subsequent rounding of the spaghetti-like extrudates (Marumerizer). In this process, all the constituents are carefully mixed before extrusion in the quantities in which they are present in the end product. It is important to ensure that the constituents are selected and combined in such a way that they form a viscous or plastic paste before extrusion. Accordingly, variations to the detergent formulations are possible to only a limited extent.

European patent application 328 880 describes a process for the production of detergent extrudates having apparent densities of 700 to 800 g/l, in which a powder-form premix is initially extruded to spaghetti-like strands under reduced pressures of 0.1 to 0.5 bar. The strands are then broken up into pieces which, in turn, are extruded into special predetermined shapes. To ensure that the individual end products have the same weight, size reduction of the spaghetti-like strand into pieces is monitored by weighing.

European patent application 351 937 on the other hand describes a process for the production of detergent gran-ules having apparent densities of at least 650 g/l which, again, is dependent on the particular formulation. Thus, detergents containing 12 to 70% by weight surfactants must contain at least 15% by weight water-soluble, crystalline inorganic salts. The ratio of crystalline salt to surfactant must not fall below a value of 0.4. The detergents are dry-mixed in known mixers and granulated.

By contrast, European patent application 352 135 describes a process for the production of granular detergents having apparent densities of 650 g/l, in which a solid alkaline material is introduced into a mixer or granulator incorporating a cutting unit and liquid anionic surfactant in the acid form is added so slowly at temperatures not exceeding 55° C. that the mixture remains solid throughout the entire neutralization process. The alkaline material has to be used in excess. Only on completion of neutralization can a liquid binder, for example water, liquid nonionic surfactant or an aqueous polycarboxylate solution, be added to the mixture. Granulation takes place in known mixers and granulators.

Finally, US-PS 3,188,291 describes a process for the production of granular soap carriers and detergents having low apparent densities in the range from about 16 to 480 g/l. In this process, the paste is extruded under pressures of from about 82 to 165 bar. Under higher pressures, the paste was too viscous and could no longer be extruded. By contrast, under pressures below 82 bar, the apparent density was too high. Accordingly, the teaching of this patent specification is that low apparent densities are obtained where relatively high pressures are applied during the extrusion process, the apparent density increasing with decreasing pressure.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the problem addressed by the present invention was to provide a process for the production of compacted granules to be used in detergents and, more particularly, laundry detergents and detergent concentrates. The granules would be stable in storage and also pourable and free-flowing. Another problem addressed by the present invention was to provide a process which would enable the shape of each individual compacted granule to be determined in advance.

In a first embodiment, therefore, the present invention relates to a process for the production of compacted granules for use in detergents. In this process, a homogeneous premix, to which a plasticizer and/or lubricant is added, is extruded through perforated dies under high pressures of 25 to 200 bar to form strands, the perforated dies having opening widths corresponding to the predetermined size of the granules. Immediately after emerging from the perforated die, the strand is cut to the predetermined size of the granules by means of a cutting unit. Application of the high working pressure plasticizes the premix during formation of the granules and ensures that the freshly extruded strands can be cut.

The premix consists at least partly of solid, preferably fine-particle, standard ingredients of detergents to which liquid constituents are optionally added. The solid ingredients may be tower powders obtained by spray drying and also agglomerates, the particular mixture constituents selected in the form of pure substances which are mixed together in fine-particle form and mixtures thereof.

Thereafter, the liquid ingredients are optionally added and the plasticizer and/or lubricant selected in accordance with the invention is subsequently incorporated.

According to the invention, these auxiliaries perform several functions. In the production of the granules, they provide for formation of the initial granule or grain by ensuring that the premix is converted into a paste extrudable under high pressure and for its optional subsequent processing by shaping, more particularly by rounding of the granule or grain initially formed. In addition, they contribute towards the stability of each granule and enable it to retain its predetermined shape, more particularly during any mixing with other constituents which may be necessary, during packaging, during transport and during storage of the granules, and in particular prevent the formation of unwanted dust-like fines. Conversely, in the practical application of the granular detergent, they provide for rapid dissolution of the granules by promoting the dissolution, emulsification or dispersion process. Finally, in particularly important embodiments of the invention, the auxiliaries under discussion here can develop their own effect in the washing process, particularly by interaction with other components of the mixture.

The plasticizers and/or lubricants used as auxiliaries may be free-flowing, gel-like or paste-like at room temperature without any need for the use of an additional liquid phase. Preferred plasticizers and lubricants are preparations based on surface-active components and/or water-soluble or water-emulsifiable or water-dispersable polymer compounds. Examples of a plasticizer and/or lubricant which may be used without any need for an additional liquid phase are any of the numerous types of nonionic surfactants typically used in detergents.

However, one preferred embodiment is characterized by the use of plasticizers and/or lubricants which have been produced using limited quantities of auxiliary liquids. Preferred auxiliary liquids are organic liquid phases soluble in or miscible with water. In the interests of process safety, it may be advisable to use comparatively high-boiling organic liquids, optionally in admixture with water. Examples of such liquids are relatively high-boiling, optionally polyfunctional alcohols, polyalkoxylates which are liquid at room temperature or at moderately elevated temperatures and the like. However, aqueous preparations of the plasticizer and/or lubricant are preferred.

The surfactants and/or polymer compounds used as plasticizers and/or lubricants are advantageously introduced into the process in such concentrated form that the character of a plastic, smoothly extrudable compound can be established with only small quantities of these auxiliaries. The pastes are preferably used in quantities of not more than 12% by weight, more particularly in quantities of 0.5 to 10% by weight and, with particular advantage, in quantities of 3 to 8% by weight, based on the mixture as a whole. At least 30% by weight pastes and gels are particularly suitable, at least 40% by weight pastes and gels being preferred.

One particularly preferred embodiment is characterized by the use of surfactant preparations having a surfactant content of at least 50% by weight and, more particularly, from 50 to 70% by weight. In this embodiment, the invention makes use of the fact that these highly concentrated aqueous surfactant mixtures in particular assume a state which can be described as paste-like or gel-like with the character of a lubricant. In addition, in another embodiment in which the granules initially formed are dried, the surfactant components thus introduced form binder-like surface and intermediate layers which are co-responsible for the cohesion of the granules. Particular significance is attributed in this regard to anionic surfactant salts, more particularly sulfates and sulfonates, from the broad range of compounds proposed here for detergents, optionally in admixture with standard nonionic compounds. A starting mixture of at least two powder components (tower powder/carrier bead) with or without addition of sodium perborate (monohydrate and/or tetrahydrate) with addition of 2 to 5% by weight water and 4 to 8% by weight of a 55 to 65% $C_{9-13}$ alkyl benzenesulfonate paste (ABS paste) is mentioned as one example in connection with the production of laundry detergents. It is equally preferred to use 3 to 8% by weight of a 50 to 60% by weight aqueous paste of an alkyl polyglycoside (APG) having the general formula $RO(G)_x$, in which R is a primary linear or 2-methyl-branched aliphatic radical containing 8 to 22 and preferably 8 to 18 carbon atoms, G is a symbol standing for a glycose unit containing 5 or 6 carbon atoms and the degree of oligomerization x is between 1 and 10. Other preferred surfactant-based plasticizer and/or lubricants are mixtures of ABS and APG pastes and mixtures of ABS pastes and ethoxylated $C_{8-18}$ fatty alcohols, mixtures of ethoxylated fatty alcohols and water and mixtures of APG : ethoxylated fatty alcohol : water in a ratio of 0.5–1:1–1.5:1, the APG content in this case being counted as active substance and not as paste.

In the same way as surfactants, polymer compounds are now commonly used in numerous detergents because they act, for example, as builders capable of binding water hardness. Examples of polymer compounds are polymers containing carboxyl groups which may even be present in the salt form, for example alkali metal salt, such as the sodium or potassium salts of homopolymeric or copolymeric polycarboxylates, for example polyacrylates, polymethacrylates and, in particular, copolymers of acrylic acid with maleic acid, preferably those of 50% to 10% maleic acid. The molecular weight of the homopolymers is generally in the range from 1,000 to 100,0000 while the molecular weight of the copolymers is generally in the range from 2,000 to 200,000 and preferably in the range from 50,000 to 120,000, based on the free acid. Suitable, albeit less preferred compounds of this class are copolymers of acrylic acid or methacrylic acid with vinyl ethers, such as vinyl methyl ethers, vinyl esters, acrylamide or methacrylamide, ethylene, propylene and styrene in which the acid makes up at least 50%. However, polymer compounds are also used for improving the soil suspending power of an aqueous wash liquor. Examples of such polymer compounds are carboxymethyl cellulose (CMC) and/or methyl cellulose (MC).

Like the surfactant preparations, highly concentrated aqueous preparations of these polymer compounds are distinguished in particular by a pronounced lubricant character which provides the crucial processing aid in the process according to the invention. At the same time, these polymer components dry during formation of the granule in accordance with the invention to form polymer films which, on the one hand, promote cohesion of the granules and, on the other hand, readily change back into a solution, emulsion or dispersion, particularly when added to aqueous media. It is particularly preferred to use 3 to 8% by weight of a 30 to 50% by weight solution of a polymer, more particularly a copolymer of acrylic acid and maleic acid, in water as plasticizer and/or lubricant. Mixtures of these polymer solutions and the plasticizers and/or lubricants based on surfactants, particularly anionic surfactants, are also advantageous.

Many other natural or synthetic polymers which may also be used as plasticizers and/or lubricants in accordance with the invention are known in practice. Among such polymers, gelatine, starch and starch derivatives and also polyvinyl alcohol are mentioned purely by way of example.

In the interests of adequate moistening and to prevent dust emission from the premix, slightly larger quantities of liquid may be required. In general, it is best to introduce these additional quantities as such into the premix and not further to dilute the surfactant pastes and/or polymer solutions used as lubricants. These additional quantities of liquid may be introduced before, during or after incorporation of the plasticizer and/or lubricant and are preferably added before incorporation of the plasticizer and/or lubricant. However, only such limited quantities of liquid phase(s) are used that a free-flowing, powder-form structure of the premix initially remains intact during simple mixing, even after addition of the plasticizer and/or lubricant. In this processing stage, the content of free water which is not bound as water of crystallization or in comparable form in the particular mixture is preferably up to 12% by weight, more preferably up to 10% by weight and, most preferably, in the range from about 4 to 8% by weight. The water introduced via the lubricant-like plasticizing aid is included in this figure.

If desired, other solids may be added to the premix after addition of the plasticizer and/or lubricant. The mixture as a whole is then briefly mixed to form a solid, preferably free-flowing premix which is suitable for introduction into a homogenizing unit.

Kneaders of any type, for example twin-screw kneaders, may advantageously be used as the homogenizing unit. In general, it can be useful to maintain safe temperature control of the mixture to be processed in the homogenizing step, the particular composition of the mixture being a determining factor for the particular optimal temperature range. The intensive mixing process can itself produce the desired increase in temperature. Moderately elevated temperatures, for example of at most about 60° to 70° C., are generally not exceeded. In cases where temperature-sensitive substances, for example perborate compounds, are included in the mixing process, it can be of advantage to maintain relatively low temperatures (for example in the range from about 40° to 45° C.).

Under the shearing effect of the kneader and the high pressure of 25 to 200 bar and preferably 30 to 200 bar building up therein, the premix is mixed and kneaded so intensively that the previously solid and dry-looking mixture is worked up into the compacted, plasticized and extrudable compound. At the same time, the cutability of the homogenized mixture is guaranteed.

In one preferred embodiment, the free-flowing premix is preferably fed continuously to a twin-screw kneader (extruder) of which the housing and the extruder/granulation head are heated to the predetermined extrusion temperature, for example to 40° to 60° C. Under the shearing effect of the extruder screws, the premix is compacted under pressures of 50 to 200 bar and, more particularly, under pressures of 80 to 180 bar, plasticized, extruded in the form of fine strands through the multiple-bore die in the extruder head and, finally, the extrudate is size-reduced by means of a rotating chopping blade, preferably to spherical or cylindrical granules. The bore diameter in the multiple-bore die and the cut strand length are adapted to the selected size of the granules. In this embodiment, it is possible to produce granules having a substantially uniformly predeterminable particle size, the absolute particle sizes being adaptable to the particular application envisaged. Absolute particle sizes may be, for example, in the range from a few tenths of a millimeter to a few centimeters, i.e. for example in the range from about 0.3 mm up to 1–2 cm. In general, however, particle diameters of up to at most 0.8 cm will be preferred. In important embodiments of the invention, the individual granules are produced with diameters in the millimeter range, for example in the range from 0.5 to 5 mm and, more particularly, in the range from about 0.8 to 3 mm.

In one important embodiment, the length-to-diameter ratio of the primary granules after cutting is in the range from about 1:1 to about 3:1.

The steps of homogenization, compaction and extrusion to which the particular premix used is subjected in accordance with the invention require only very short times. Periods of a few minutes, preferably less than 5 minutes and, more particularly, not more than 3 minutes, are normally required to convert the premix into the compacted, plasticized primary granules.

In general, it is not necessary, but may be of advantage, depending on the formulation, to subject the strand issuing from the multiple-bore die to at least partial surface cooling by shock cooling, more particularly by blowing cold air into the vicinity of the granulation blade. At the same time, surface water is partly removed from the primary granules formed. If necessary, the still plasticized granules can be safely prevented from sticking together in this way.

However, in this first homogenizing step of the process, granulation is not confined to processing of the plasticized premix in screw extruders and multiple-bore dies of the described type arranged in the extruder head. According to the invention, plasticized, compacted and homogenized mixtures can also be granulated in similar, standard granulating machines, for example in pelletizing presses, single-screw and twin-screw extruders, planetary roll extruders and the like.

In another preferred embodiment, the still plastic, moist primary granules are initially subjected to another shaping processing step in which the edges present on the crude granules are rounded off so that spherical or at least substantially spherical granules can ultimately be obtained. By using small quantities of drying powder in this final processing stage, the granules can be safely prevented from undesirably sticking together before they are finally dried. Drying powders suitable for detergents may be powder-form valuable materials or even corresponding inert materials. A particularly suitable valuable material for this purpose is, for example, zeolite powder, such as zeolite NaA powder. .

The final shaping of the still moist granules from the extruder/granulator can be carried out in batches or continuously in commercially available rounding machines. Suitable rounding machines are, for example, corresponding types with a rotating bottom disk in which the desired degree of rounding can be adjusted by variation of the residence time of the granules in the rounding machine and/or the rotational speed of the disk.

After the final shaping step, the granules are preferably subjected to drying, for example in a fluidized-bed dryer, in which moderate final product temperatures of, for example, 55° to 60° C. are adjusted for moderately elevated inflowing-air temperatures, more particularly up to at most 80° C., and have to be maintained thereafter. After adequate drying, the product is cooled, for example with cold air. The content of free water in the granules can be reduced in this way. Preferred residual contents of free water are up to about 1% by weight and preferably in the range from about 0.1 to 0.5% by weight. The very low-dust product accumulating can be graded, for example by sieving, in order to remove any coarse particles formed. The grain component to be established in accordance with the invention is generally above 90% and preferably above 95% of the granulated material. If desired, this drying step may also be carried out immediately after extrusion of the primary granules and, hence, before final shaping, if any, in a rounding machine.

However, the granules may also be subjected at leastly partly to "internal drying". By using moisture-binding constituents in the premix, it is possible to utilize the plasticizing effect of the liquid components initially introduced in the short processing time. In this way, drying of the granules takes place "from inside outwards" through the binding of at least parts of these liquid components by the constituents introduced, so that external drying can be shortened or even eliminated altogether. Constituents capable of binding water in the form of water of crystallization are, for example, sodium sulfate and/or sodium carbonate in anhydrous or low-water form or even a zeolite which has been freed from water of crystallization.

In another preferred embodiment, the still plastic granules initially formed may be treated with other active substances before, during and/or after the rounding step, if any. However, even sensitive constituents for example, more particularly temperature-sensitive constituents, may advantageously be added to the dried granules, for example by spraying and/or by addition as separately formed granules to form a multi-granule mixture. With its granules produced in a new way, the invention encompasses both ready-to-use multicomponent mixtures in the form of uniform granules and also partial products which have to be mixed with other constituents of the particular detergent in question to complete the formulation. Advantageously, more than 60% by weight and, in particular, more than 70% by weight of the mixture as a whole are granules having a highly compacted and solid structure obtained by the process according to the invention.

Another particularly important embodiment of the invention is characterized by the use of granule systems representing a combination of granules of different composition. In this way, potentially reactive components or at least only partly compatible components can be combined in a stable manner. One example of such systems are standard laundry detergents which now use at least two types of granule in admixture with one another in the new formulation. In a first, for example spherical, type of granule, the bleach component, more particularly perborate containing water of crystallization, and sodium carbonate are pelletized using part of the plasticizer and/or lubricant while in a separate, second type of granule, the zeolite used as detergent builder, more particularly zeolite NaA, is extruded with the rest of the detergent constituents. The interactions between perborate and zeolite which have a substantial effect on the stability of the mixture in storage and which have to be taken into account in powder formulations are ruled out in this way. This possibility of using granule systems of granules of different composition can be utilized in virtually any combination.

In another embodiment, the granules according to the invention can be "recycled", i.e. they may be used in combination with other substances in the first process step for preparation of the plasticized premix.

The material densities in the granules and, hence, the apparent density of the granules are critically co-determined by the pressures applied during extrusion of the homogenized material through the multiple-bore dies. By building up a sufficiently compacted basic structure in the compound to be extruded and applying correspondingly high pressures, apparent densities distinctly above 700 g/l, preferably above 750 g/l and, more particularly, in the range from about 800 to approximately 1,000 g/l can be established, for example, in typical laundry detergent formulations. Thus, apparent densities of 850 to 980 g/l can be established in commercial laundry detergent formulations for good flow properties and a preferably uniform spherical granule structure. Free-flowing granules having uniform apparent densities in the dry state of 950 to 980 g/l for an average particle size of the spherical granules of approximately 1 mm have been produced in similar mixtures.

The process according to the invention is distinguished by a very small retained component. The retained component after sieving of the granules through a 1.6 mm sieve was at most 3%. As with conventional detergent formulations, sensitive formulation constituents, for example bleach activators, enzymes, foam inhibitors, more particularly silicone foam inhibitors, fragrance and the like, may be added to the granules. Even then, detergents having apparent densities of the order of 900 g/l are still obtained.

Commercial laundry detergents in the form of free-flowing powders and/or granules generally contain a combination of anionic and nonionic washing-active components. In general, the anionic surfactant components make up the larger part and the nonionic surfactant components the smaller part of the surfactant mixture. The total surfactant content for free-flowing powder-form household detergents is of the order of 12 to at most 15% by weight, based on the detergent as a whole. The same also applies to commercially available detergents of increased apparent density. By contrast, the invention enables the described process to be used for the production of substantially tack-free, pourable, free-flowing and storable detergent concentrates, more particularly corresponding concentrates for laundry detergents having a distinctly increased content of washing-active surfactant compounds. Thus, laundry detergent concentrates containing up to about 35% by weight and preferably from about 15 to 25% by weight surfactant can be produced without any danger of sticking and/or softening of the product such as occur(s) in commercial powder-form mixtures when the surfactant content is increased to this level. By combining the measures of compacting the mixtures to high apparent densities and, at the same time, increasing the quantity of washing-active ingredients, particularly the surfactants, in the detergent mixture, the goal of space-saving and low-packaging detergent preparations is optimally achieved without having to leave the range of free-flowing, storable and otherwise entirely satisfactory detergent preparations.

The production of detergents by the process according to the invention of granulation to a predeterminable particle size affords a number of advantages:

It has been found that, in the process according to the invention, the bleach, more particularly sodium perborate in the form of the monohydrate and/or the tetrahydrate, can be processed with the crude mixture to be plasticized and then extruded without incurring substantial losses of perborate. Accordingly, each granule contains the predetermined perborate component. It is possible to use spray-dried powders with variable additions. On the other hand, neither spray-dried powders nor pre-formed powders of bead structure are necessary for the production of the crude mixtures to be extruded. The use or addition of heavy powders of the individual raw materials is not necessary. The processing of the nonionic surfactants normally used in detergents is not a problem, nor are there any of the pluming problems which normally arise during spray drying. The nonionic surfactants are delivered without difficulty through incorporation in the mixture before extrusion and may even provide valuable assistance to the process in the described manner in the form of a highly concentrated aqueous gel or paste.

It is possible to produce detergents having an increased content of surfactants or surfactant mixtures selected as required which would not have been possible by spray drying. The possible incorporation of foam inhibitors in liquid form saves a process for the separate preparation of foam inhibitor/solid carrier concentrates. There is thus no need to incorporate foam inhibitor granules during production of the detergent. It has proved to be of particular advantage directly to incorporate the foam inhibitor in the plasticizer and/or lubricant.

In one particular embodiment, the invention relates to universal laundry detergents which are present in the new form of free-flowing granules having apparent densities above 750 g/l and, more particularly, above 800 g/l, for example in the range from 850 to 950 g/l, and which in an important embodiment are characterized by a uniform particle shape and size. The preferred particle shape is spherical. Preferred particle sizes of the spherical particles are in the range from about 0.5 to 5 mm and, more particularly, in the range from about 0.8 to 2 mm. The constituents of the formulation may correspond in type and quantity to typical builder-containing laundry detergents. General particulars of the composition of suitable active-substance mixtures are given in the following paragraphs which also provide a detailed account of typical constituents of laundry detergents.

Suitable anionic surfactants are, for example, those of the sulfonate and sulfate type. Suitable surfactants of the sulfonate type are alkyl benzenesulfonates ($C_{9-15}$ alkyl), olefin sulfonates, i.e. mixtures of alkene and hydroxyalkane sulfonates, and disulfonates of the type obtained, for example, from $C_{12-18}$ monoolefins with a terminal or internal double bond by sulfonation with gaseous sulfur trioxide and subsequent alkaline or acidic hydrolysis of the sulfonation products. Other suitable surfactants of the sulfonate type are dialkane sulfonates obtainable from $C_{12-18}$ alkanes by sulfochlorination or sulfoxidation and subsequent hydrolysis or neutralization or by addition of bisulfites onto olefins and, in particular, the esters of α-sulfonated fatty acids (ester sulfonates), for example the α-sulfonated methyl esters of hydrogenated coconut oil, palm kernel oil or tallow fatty acids.

Suitable surfactants of the sulfate type are the sulfuric acid monoesters of primary alcohols of natural and synthetic origin, i.e. of fatty alcohols, for example coconut oil fatty alcohols, tallow fatty alcohols, oleyl alcohol, lauryl, myristyl, palmityl or stearyl alcohol, or the $C_{10-20}$ oxoalcohols and those of secondary alcohols having the same chain length. Sulfuric acid monoesters of alcohols ethoxylated with 1 to 6 mol ethylene oxide, such as 2-methyl-branched $C_{9-11}$ alcohols containing on average 3.5 mol ethylene oxide, are also suitable. Sulfated fatty acid monoglycerides are also suitable.

Other suitable surfactants of the sulfate type are, for example, soaps of natural, synthetic, preferably saturated, fatty acids. Soap mixtures derived from natural fatty acids, for example coconut oil, palm kernel oil or tallow fatty acids, are particularly suitable. Soap mixtures of which 50 to 100% consist of saturated fatty acids and 0 to 50% of oleic acid soap are preferred.

The anionic surfactants may be present in the form of their sodium, potassium and ammonium salts and in the form of soluble salts of organic bases, such as mono-, di- or triethanolamine. The content of anionic surfactants or anionic surfactant mixtures in the detergents according to the invention is preferably from 5 to 40% by weight and, more preferably, from 8 to 30% by weight.

Suitable nonionic surfactants are adducts of 1 to 40 mol and preferably 2 to 20 mol ethylene oxide with 1 mol of an aliphatic compound essentially containing 10 to 20 carbon atoms from the group consisting of alcohols, carboxylic acids, fatty amines, carboxylic acid amides or alkane sulfonamides. The adducts of 8 to 20 mol ethylene oxide with primary alcohols, for example with coconut oil or tallow fatty alcohols, with oleyl alcohol, with oxoalcohols or with secondary alcohols containing 8 to 18 and preferably 12 to 18 carbon atoms are particularly important.

In addition to water-soluble nonionics, however, water-insoluble or substantially water-insoluble polyglycol ethers containing 2 to 7 ethylene glycol ether units in the molecule are also of interest, particularly if they are used together with water-soluble nonionic or anionic surfactants.

Other suitable nonionic surfactants are alkyl glycosides corresponding to the general formula $R-O-(G)_x$, in which R is a primary straight-chain or 2-methyl-branched aliphatic radical containing 8 to 22 and preferably 12 to 18 carbon atoms, G is a symbol which stands for a glycose unit containing 5 or 6 carbon atoms and the degree of oligomerization x is between 1 and 10.

Suitable organic and inorganic builders are soluble and/or insoluble components showing a mildly acidic, neutral or alkaline reaction which are capable of precipitating or complexing calcium ions. Suitable and, in particular, ecologically safe builder systems, such as finely crystalline, synthetic water-containing zeolites of the NaA type, which have a calcium binding power of 100 to 200 mg CaO/g (as determined in accordance with DE 24 12 837), are preferably used. Their average particle size is normally in the range from 1 to 10 μm (method of measurement: Coulter Counter, volume distribution). Their content is generally from 0 to 40% by weight and preferably from 10 to 30% by weight, based on anhydrous substance. Zeolite NaA accumulates during its production in the form of a water-containing slurry (master batch) which is subjected to drying, particularly spray drying, by the methods typically used for the production of laundry detergents.

According to the invention, it is possible to introduce the zeolite or at least parts of the zeolite into the premix in the form of the non-dried master batch or a material which has only been partly dried and therefore depleted only slightly in its water content.

Other suitable builder constituents which may be used in particular together with the zeolites include (co)polymeric polycarboxylates, such as polyacrylates, polymethacrylates and, in particular, copolymers of acrylic acid with maleic acid, preferably those of 50% to 10% maleic acid. The molecular weight of the homopolymers is generally in the range from 1,000 to 100,000 while the molecular weight of the copolymers is in the range from 2,000 to 200,000 and preferably in the range from 50,000 to 120,000, based on free acid. A particularly preferred acrylic acid/maleic acid copolymer has a molecular weight of 50,000 to 100,000. Suitable, albeit less preferred compounds of this class are copolymers of acrylic acid or methacrylic acid with vinyl ethers, such as vinyl methyl ethers, in which the acid makes up at least 50%. It is also possible to use polyacetal carboxvlic acids of the type described for example, in U.S. Pat. Nos. 4,144,226 and 4,146,495 and polymeric acids which are obtained by polymerization of acrolein and subsequent disproportionation with alkalis and which are made up of acrylic acid units and vinyl alcohol units or acrolein units.

Useful organic builders are, for example, polycarboxylic acids used in the form of their sodium salts, such as citric acid and nitrilotriacetate (NTA) providing there are no ecological objections to their use.

In cases where a phosphate content is tolerated, it is even possible to use phosphates, particularly pentasodium triphosphate, and even pyrophosphates and orthophosphates which act primarily as a precipitant for lime salts. The phosphate content, based on pentasodium triphosphate, is under 30% by weight. However, phosphate-free detergents are preferably used.

Suitable inorganic non-complexing salts are the bicarbonates, carbonates, borates or silicates of the alkali metals which are also known are "washing alkalis". Of the alkali metal silicates, sodium silicates with a ratio of $Na_2O$ to $SiO_2$ of 1:1 to 1:3.5 are particularly suitable.

The other detergent constituents include redeposition inhibitors (soil suspending agents), foam inhibitors, bleaches and bleach activators, optical brighteners, enzymes, fabric softeners, dyes and fragrances and also neutral salts.

The function of redeposition inhibitors is to keep the soil detached from the fibers suspended in the liquor and thus to prevent its redeposition. Redeposition inhibitors include water-soluble colloids mostly of organic character, such as for example water-soluble salts of polymeric carboxylic acids, glue, gelatine, salts of ether carboxylic acids or ether sulfonic acids or starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. Carboxymethyl cellulose (Na salt), methyl cellulose, methylhydroxyethyl cellulose and mixtures thereof are preferably used.

The foaming power of the surfactants can be increased or reduced by combining suitable types of surfactant. A reduction can also be obtained by addition of non-surface-active organic substances. In many cases, reduced foaming power, which is desirable for machine washing, is obtained by combining various types of surfactant, for example sulfates and/or sulfonates, with nonionics and/or with soaps. In the case of soaps, the foam-inhibiting effect increases with the degree of saturation and the C-chain length of the fatty acid residue. Accordingly, suitable foam-inhibiting soaps are soaps of natural and synthetic origin which have a high percentage content of $C_{18-24}$ fatty acids. Suitable non-surface-active foam inhibitors are organopolysiloxanes and mixtures thereof with microfine, optionally silanized, silica, paraffins, waxes, microcrystalline waxes and mixtures thereof with silanized silica. Bis-acyl amides derived from $C_{12-20}$ alkyl amines and $C_{2-6}$ dicarboxylic acids are also suitable. Mixtures of various foam inhibitors, for example mixtures of silicones and paraffins or waxes, may also be used with advantage. The foam inhibitors are preferably fixed to a granular carrier soluble or dispersible in water or are added to the plasticizer and/or lubricant.

Among the compounds yielding $H_2O_2$ in water which serve as bleaches, sodium perborate tetrahydrate ($NaBO_2.H_2O_2.3\ H_2O$) and sodium perborate monohydrate ($NaBO_2.H_2O_2$) are particularly important. Other useful bleaches are, for example, peroxycarbonate ($Na_2CO_3.1.5\ H_2O_2$), peroxypyrophosphates, citrate perhydrates and $H_2O_2$-yielding peracidic salts or peracids, such as perbenzoates, peroxaphthalates, diperazelaic acid or diperdodecanedioic acid.

To obtain an improved bleaching effect where washing is carried out at temperatures of 60° C. and lower, bleach activators may be incorporated in the preparations. Examples of suitable bleach activators are N-acyl or O-acyl compounds which form organic peracids with $H_2O_2$, preferably N,N'-tetraacylated diamines, such as N,N,N',N'-tetraacetyl ethylenediamine, also carboxylic anhydrides and esters of polyols, such as glucose pentaacetate.

The detergents may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazin-6-ylamino)-stilbene-2,2,-disulfonic acid or compounds of similar structure which, instead of the morpholino group, contain a diethanolamino group, a methylamino group, an anilino group or a 2-methoxyethylamino group. Brighteners of the substituted 4,4'-distyryl diphenyl type, for example the compound 4,4'-bis-(4-chloro- 3-sulfostyryl)-diphenyl, may also be present. Mixtures of the brighteners mentioned above may also be used.

Suitable enzymes are enzymes from the class of proteases, lipases and amylases or mixtures thereof. Enzymes obtained from bacterial strains or fungi, such as Bacillus subtilis, Bacillus licheniformis and Streptomyces griseus, are particularly suitable. The enzymes may be adsorbed onto supports and/or encapsulated in shell-forming substances to prevent them against premature decomposition.

Suitable stabilizers, particularly for per compounds and enzymes, are the salts of polyphosphonic acids, such as 1-hydroxyethane-1,1-diphosphonic acid (HEDP) and aminotrimethylene phosphonic acid (ATP) or diethylenetriamine pentamethylene phosphonic acid (DTPMP or DETPMP).

EXAMPLES

Examples 1 to 5

To produce laundry detergents in the form of the storable, free-flowing granules according to the invention, two mixture components separately obtained beforehand were mixed in the ratios shown in Table 1 and worked up.

The first mixture component was a spray-dried powder (tower powder) based on the following main components:

Surfactant mixture I: 17.5% by weight
Calcined soda: 35% by weight
Zeolite NaA, anhydrous substance: 22% by weight
Acrylic acid copolymer (Sokalan CP5®): 10% by weight
Water, bound: 8.2% by weight
Water, free: 1.8% by weight
Remainder: standard detergent auxiliaries Surfactant mixture I consisted of Na dodecyl benzenesulfonate (ABS) and tallow fatty alcohol reacted with 5 ethylene oxide groups (EO) in a ratio of 11.5:1.

The second mixture component was a nonionic surfactant carrier bead made up of the following main components:

$C_{12-18}$ fatty alcohol containing 5 EO: 22% by weight
Zeolite NaA, anhydrous substance: 55% by weight
Acrylic acid copolymer (Sokalan CP5®): 3% by weight
Water, bound: 14.5% by weight
Water, free: 1.3% by weight
Remainder: sodium sulfate and other typical auxiliaries Following the procedure described in detail in the following, the two mixture constituents were size-reduced and mixed, after which the necessary quantity of water and the particular quantity of 55% aqueous ABS paste shown in Table 1 were pumped in. Finally, sodium perborate monohydrate was added in Examples 1 to 3, followed by brief mixing.

The free-flowing granules thus formed were then subjected to homogenizing compaction and plasticization. The paste formed was extruded into a strand, cut into cylindrical granules, rounded and dried.

The individual steps are described in more detail in the following:

Preparation of the premix

The tower powder (TP) and the carrier bead (CB) were introduced into a batch mixer (20 liters) equipped with a size-reducing cutter head and mixed for 0.5 mins. With the mixture and the size-reducing cutter head switched on, the necessary quantity of water and then the entire ABS paste were pumped in through a slot die (2.5 mins.) Finally, the entire quantity of sodium perborate monohydrate was added, if necessary, followed by mixing for 1 minute. The resulting premix was free-flowing and could be used to charge the continuous kneader/extruder.

Kneader/extruder granulation

The premix obtained was fed continuously to a twin-screw kneader (extruder) of which the housing, including the extruder granulation head, was kept at a temperature of around 45° to 50° C. Under the shearing effect of the extruder screws, the premix was plasticized and subsequently extruded through the extruder head multiple-bore die to form fine strands (1.0 and 1.2 mm diameter) which, after leaving the die, were size-reduced to cylindrical granules by means of a chopping blade (length-to-diameter ratio approx. 1, hot chopping).

Rounding

The hot and moist granules coming from the granulation extruder were rounded off continuously or in batches in a commercially available rounding unit of the Marumerizer type with addition of zeolite NaA powder as powdering agent.

The desired degree of rounding was adjusted by varying the residence time of the granules in the rounding unit and the rotational speed of the disk.

Drying of the granules

The moist granules coming from the rounding unit were dried for 15 minutes to a product temperature of 55°-60° C. in a continuous fluidized-bed dryer in which the air entry temperature was 75° to 80° C. A free-flowing product was obtained after cooling of the granules to 30° C. with cold air.

Sieving of the granules

The low-dust product was sieved through a 1.6 mm mesh sieve. In every case, the fraction retained on the sieve, i.e. particles larger than 1.6 mm in size, was at most 3%. The sieved granules were used as starting material for the mixing of detergent end products.

TABLE 1

| | Examples | | | | |
|---|---|---|---|---|---|
| Extrudable premixes | 1 | 2 | 3 | 4 | 5 |
| Composition (in % by weight) | | | | | |
| Tower powder | 50.3 | 50.3 | 51.12 | 60.91 | 62.6 |
| Carrier bead | 23.1 | 23.1 | 23.47 | 28.0 | 28.7 |
| Na perborate monohydrate | 16.0 | 16.0 | 16.27 | — | — |
| ABS paste, 55% | 8.55 | 8.55 | 4.06 | 8.57 | 4.2 |
| Water, additional | 2.05 | 2.05 | 5.08 | 2.52 | 4.5 |
| Extrusion conditions | | | | | |
| Extruder pressure (bar) | 100 | 115 | 80 | 107 | 95 |
| Multi-bore dies (mm) | 1.2 | 1.0 | 1.2 | 4.0 | 1.2 |
| Extruder throughput (kg/h) | 60 | 55 | 50 | 47 | 40 |
| Product discharge temperature (°C.) | 53 | 50 | 46 | 43.5 | 41 |

TABLE 1-continued

| Extrudable premixes | Examples 1 | 2 | 3 | 4 | 5 |
|---|---|---|---|---|---|
| Batch rounding | | | | | |
| Batch time (mins.) | 1 | 1 | 1 | 1 | 1 |
| Rotor speed (m/s) | 30 | 30 | 30 | 30 | 30 |
| Zeolite NaA powder (% by weight) | 3.0 | 3.0 | 3.0 | 3.0 | 3.0 |
| Fluidized-bed drying | | | | | |
| Air entry temperature (°C.) | 75 | 75 | 75 | 75 | 75 |
| Product temperature (°C.) | 60 | 60 | 60 | 60 | 60 |
| Sieving | | | | | |
| Yield of granules (%) | 97 | 97 | 97 | 97 | 97 |
| Apparent density of granules (g/l) | 950 | 960 | 910 | 890 | 910 |

Example 6

2.5% by weight water, 5% by weight nonionic surfactant based on $C_{12-18}$ fatty alcohol.5 EO and 4% by weight 55% ABS Na paste were added as in Examples 1 to 5 to a tower powder (ABS 9%, calcined soda 25%, zeolite NaA (anhydrous substance) 38%, acrylic acid copolymer 8%, water 15%, remainder standard detergent constituents) used in a quantity of 88.5% by weight and worked up.

Storable, free-flowing granules having an apparent density of 950 g/l were obtained.

Example 7

Storable, free-flowing and, at the same time, readily water-soluble spherical granules were obtained from a mixture of tower powder and carrier bead as in Examples 1 to 5 using a 40% solution of the acrylic acid copolymer (Sokalan CP5 ®) in a quantity of 4.5% by weight as plasticizer and with addition of 6% by weight water.

Example 8

The following mixture components were used in accordance with the teaching of Examples 1 to 5:

Free-flowing tower powder based on the following main components: 22% by weight surfactant mixture I, 2.5% by weight tallow-based Na soap, 15% by weight calcined soda, 7% by weight waterglass, 26.5% by weight zeolite NaA (anhydrous substance), 7.5% by weight acrylic acid copolymer, 12% by weight water, remainder typical auxiliaries.

Carrier bead based on the following main components: 22% by weight $C_{12-18}$ fatty alcohol.5 EO, tallow-based Na soap 2% by weight, zeolite NaA (anhydrous substance) 55% by weight, acrylic acid copolymer 3% by weight, water 15% by weight.

Approx. 11% by weight (based on the mixture as a whole) 60% ABS paste was added to and homogenized with the product size-reduced and mixed in accordance with Examples 1 to 5. The material formed was subjected to plasticizing compaction by kneading and extruded. Storable (storage time: 1 year), free-flowing and pourable, readily dispensable spherical granules having apparent densities of 900 to 950 g/l were obtained.

Example 9

A phosphate-free, pH-neutral tower powder having the following composition

Surfactant mixture I: 16% by weight

Soap: 2.8% by weight

Zeolite: 16.0% by weight

Sokalan CP5 ®: 3.2% by weight $Na_2SO_4$: 58% by weight

Remainder: typical minor components was intensively mixed with 5% by weight ABS paste (40%), subsequently plasticized in an extruder and then extruded through a multiple-bore die (bore diameter 1.2 mm). The temperature was controlled by heating of the housing to produce product temperatures of 45° to 50° C. The compacted strands coming from the multiple-bore die were cut by rotating blades into cylindrical particles having a length-to-diameter ratio of approx. 1. The still warm particles were rounded in a Marumerizer with addition of 2% by weight zeolite NaA powder and dried in a fluidized-bed dryer as described above. Products having apparent densities of 850 to 920 g/l were obtained after drying (the particular apparent density being dependent on the degree of rounding). Working up with 3% by weight standard detergent auxiliaries (fragrance, enzyme and, optionally, dye) did not produce any significant change in the apparent den-sities.

Example 10

A mixture of 12.5% by weight ABS and 7.5% by weight $C_{12-18}$ fatty alcohol.5 EO, 25% by weight soda, 40% by weight zeolite (anhydrous substance) and 12% by weight bound water and also several minor components was prepared in a mixer and subsequently sprayed with 5% by weight of a 55% ABS paste, based on the sum of mixture and ABS paste.

Compacting plasticization and extrusion of the compacted paste were carried out in a pelletizing press. To this end, the following procedure was adopted:

The premix prepared as described above was introduced into the annular space of the pelletizing press by a feed screw. The press consisted of a rotating wooden roller in which radial bores were formed at regular intervals over the entire circumference. A compression roller was eccentrically arranged in this annular cavity unit. The cavity unit used in this test had a diameter of approx. 80 mm and approx. 500 bores. The bore diameter was 1.5 mm.

The product was continuously delivered by the screw and was compacted in the gap between the roller and the cavity plate. On reaching the pressure defined by the extrudability of the paste, the product was forced through the radial bores of the cavity unit and the entire strand pushed out by the corresponding length. The strand was cut up into lengths of 1.5 mm by a blade arranged on the outside of the cavity plate. The cylindrical granules thus produced were rounded in another process step. This was done by a rolling movement in a rounding unit. The granules obtained were either rounded only at the corners or were spherical in shape, depending on the residence time (between 15 and 120 seconds) in the rounding unit.

In another test, the strength of the granules was further improved by addition of 3% by weight zeolite NaA in the rounding step.

The water required for granulation was removed by subsequent drying in a fluidized-bed dryer.

Abrasion-resistant, free-flowing granules having an apparent density in the dry state of 950 g/l were obtained.

We claim:

1. A process for the production of compacted granules for use in a detergent composition, comprising providing a homogeneous, solid, granular free-flowing premix containing a plasticizer or lubricant, extruding said premix through a perforated die under a pressure of from about 25 bar to about 200 bar to form plasticized strands of said premix wherein said perforated die has an opening width corresponding to a predetermined size of said granules, and after emerging from said perforated die, cutting said strands to the predetermined size of said granules by means of a cutting unit.

2. A process as in claim 1 wherein said pressure is between about 30 bar and about 200 bar, and said granules have a diameter of from about 0.5 mm to about 5 mm.

3. A process as in claim 1 wherein said plasticizer or lubricant is selected from the group consisting of an anionic surfactant, a nonionic surfactant, a water-soluble, water-emulsifiable or water-dispersible polymer compound, and mixtures thereof.

4. A process as in claim 3 wherein said plasticizer or lubricant is present as an aqueous surfactant paste and is added in a quantity of from about 0.5 to about 10% by weight, based on the weight of said premix.

5. A process as in claim 1 wherein said premix contains up to about 10% by weight of free water, based on the weight of said premix.

6. A process as in claim 1 including homogenizing said premix with a homogenizing unit selected from a granulator, a pelletizing press, a single-screw or twin-screw extruder, and a planetary roll extruder.

7. A process as in claim 6 wherein under the shearing effect of said extruder, compacting said premix at a pressure of from about 50 bar to about 180 bar, plasticizing said premix, extruding said premix to form said strands, size-reducing said strands by means of a rotating chopping blade to spherical or cylindrical granules having a length-to-diameter ration of from about 1:1 to about 3:1, and while said granules are still moist and plastic, rounding said granules using a rounding unit while adding thereto a drying powder.

8. A process as in claim 1 wherein said premix contains at least one moisture-binding constituent in anhydrous form, and said granules are at least partly internally dried by binding of the liquid components that are present in said premix, whereby external drying of said granules is shortened or eliminated.

9. A process as in claim 7 including contacting said granules with a temperature-sensitive constituent in the form of separate granules to provide a multiple-granule mixture.

* * * * *